US009541378B2

(12) United States Patent
Charles et al.

(10) Patent No.: US 9,541,378 B2
(45) Date of Patent: Jan. 10, 2017

(54) SASH POSITION DETERMINING SYSTEM

(71) Applicants: Donald E. Charles, Wauconda, IL (US); Guy P. Caliendo, Algonquin, IL (US)

(72) Inventors: Donald E. Charles, Wauconda, IL (US); Guy P. Caliendo, Algonquin, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 972 days.

(21) Appl. No.: 13/832,690

(22) Filed: Mar. 15, 2013

(65) Prior Publication Data

US 2014/0273783 A1 Sep. 18, 2014

(51) Int. Cl.

| | |
|---|---|
| ***G01B 11/14*** | (2006.01) |
| ***G01B 11/28*** | (2006.01) |
| ***B08B 15/02*** | (2006.01) |
| ***G06T 7/00*** | (2006.01) |
| ***G06T 7/60*** | (2006.01) |

(52) U.S. Cl.

CPC ............. *G01B 11/14* (2013.01); *G01B 11/285* (2013.01); *G06T 7/0044* (2013.01); *G06T 7/602* (2013.01); *B08B 15/023* (2013.01); *G06T 2207/30108* (2013.01); *G06T 2207/30204* (2013.01)

(58) Field of Classification Search

CPC ..... G01B 11/14; G01B 11/285; B08B 15/023; G06T 7/602; G06T 7/0044; G06T 2207/30108

See application file for complete search history.

(56) References Cited

U.S. PATENT DOCUMENTS

| | | | | | |
|---|---|---|---|---|---|
| 4,685,074 | A * | 8/1987 | May | G01B 11/285 | 356/629 |
| 4,893,551 | A * | 1/1990 | Sharp | B08B 15/023 | 454/56 |
| 5,090,303 | A * | 2/1992 | Ahmed | B08B 15/023 | 454/238 |
| 5,090,304 | A * | 2/1992 | Egbers | G05D 3/1472 | 454/59 |

(Continued)

FOREIGN PATENT DOCUMENTS

| | | |
|---|---|---|
| EP | 0541864 A1 | 5/1993 |
| EP | 2022745 A1 | 2/2009 |
| WO | 00/33983 A1 | 6/2000 |

OTHER PUBLICATIONS

PCT Search Report dated May 26, 2014, for PCT Application No. PCT/US2014/027970. (11 pages).

*Primary Examiner* — John Lee

(57) ABSTRACT

A system for determining a sash panel position. An example system includes a linear array of light emitting elements spaced at equal distances from one another mounted on a fume hood frame. The light emitting elements generate a light path towards a sash panel such that the sash panel blocks the light path when positioned at the light emitting element. A linear array of light sensing elements is spaced at equal distances from one another on a side opposite the sash panel. The light sensing elements receive the light path generated by corresponding light emitting elements when the sash panel does not block the light path. The light sensing elements may be on modules having shift registers with bits corresponding to the light sensing elements. The shift register stores a state of the light sensing element and outputs a series of bits indicating the state of each light sensing element.

22 Claims, 7 Drawing Sheets

(56) References Cited

U.S. PATENT DOCUMENTS 5,092,227 A 3/1992 Ahmed et al.
5,170,673 A * 12/1992 Ahmed ................. B08B 15/023 454/56
5,733,188 A * 3/1998 Jacob .................... B08B 15/023 454/56
5,764,579 A * 6/1998 McMasters ........... B08B 15/023 454/340
5,882,254 A * 3/1999 Jacob .................... B08B 15/023 454/56
5,920,488 A * 7/1999 Arnold .................. B08B 15/023 454/239
5,988,860 A * 11/1999 Hefferen .............. G05D 7/0635 236/49.3
6,137,403 A * 10/2000 Desrochers ........... B08B 15/023 340/540
6,272,399 B1 * 8/2001 Fish, Jr. ................ B08B 15/023 454/239
6,561,892 B2 * 5/2003 Kolkebeck ............ B08B 15/023 454/56
9,267,791 B2 * 2/2016 McIlhany ............. B08B 15/023
2002/0187743 A1 12/2002 Kolkebeck
2005/0048900 A1 3/2005 Scholten
2006/0032492 A1 * 2/2006 Bagwell .................... F15D 1/02 126/299 R
2009/0108987 A1 * 4/2009 Shikai ..................... B66B 13/26 340/3.1
2011/0005507 A9 * 1/2011 Bagwell .................... F15D 1/02 126/299 R
2011/0174384 A1 * 7/2011 Bagwell .................... F15D 1/02 137/13
2014/0080396 A1 * 3/2014 Charles ................. B08B 15/023 454/61
2014/0094106 A1 * 4/2014 McIlhany ............. B08B 15/023 454/256
2014/0120819 A1 * 5/2014 Stakutis ................ F24F 3/1607 454/56
2014/0273783 A1 * 9/2014 Charles .................. G01B 11/14 454/61

* cited by examiner

SASH POSITION DETERMINING SYSTEM

TECHNICAL FIELD

The present invention relates generally to fume hoods, and more particularly, to systems and methods for determining the position of a fume hood sash.

BACKGROUND

A fume hood is a ventilated structure that provides a controlled space in which a lab worker (where "lab worker" refers to a lab worker, lab technician, or any person working in a laboratory whether in a chemical company laboratory, a university, hospital, or other institution) performs experiments with potentially toxic chemicals. The controlled space is partially enclosed in the fume hood structure, which limits exposure to chemicals, as well as other noxious fumes, vapors, or dust as the lab worker works while positioned outside of the fume hood. The lab worker is provided access to the controlled space through a sash opening. The sash opening can be adjusted by moving sash panels (also referred to as fume hood doors, sash doors, sashes) that adjustably cover an opening in the fume hood. An exhaust fan draws air from the room through the sash opening into the work area in the controlled space. The air is then vented outside of the building by the exhaust fan thereby removing the fumes, vapors or dust. The amount of air required to contain the chemicals is related to the open area of the sashes that are between the user and the chemicals. The greater the open area, the more air flow that is required to contain the chemicals.

The area of the sash opening in fume hoods may be controlled by the user. Fume Hood Controllers are being provided to measure the position of each sash panel, and to use the sash positions to determine the total open area of the fume hood. The Fume Hood Controller then uses the total open area, the measured exhaust flow, and the user-defined face velocity set point to maintain the required volume of airflow through the fume hood. The required volume of airflow is the volume of airflow that is sufficient to maintain the chemicals in the fume hood.

Fume hood controllers typically include a suitable processor and supporting memory, and permits entry and storage of the dimensions of the sash panels and other structural features. A sensor or multiple sensors are provided at strategic locations in the fume hood to determine the position of each sash. The open area of the fume hood is determined using the position of the sashes and the dimensions of the structure according to the geometry of the sash opening and fume hood.

The sensors used to detect the positions of the sashes typically require attachment or mounting by rather complex structure that is typically difficult to install. One example sensor structure uses conductive strips layered opposite a resistive strip and adhesively mounted on an edge of a sash. An actuator block is movably mounted in a track on a base member mounted to the fume hood and extending along a length in parallel with, and in suitably close proximity to, the edge of the sash. The actuator block is linked to a mounting block affixed to the sash such that when the sash panel moves, the linkage moves the actuator block in the track of the base member. As the actuator block moves within the base member, a steel ball that is spring loaded in the actuator block presses the conductive strips together. The conductive strips are energized in a voltage divider circuit and when the steel ball presses on the conductive strips, a short circuit is created and the position of the steel ball may be determined by taking voltage measurements.

Another way of sensing the position of fume hood sashes involves positioning a string of light emitters and corresponding detectors on a surface of the fume hood in proximity to one side of a sash. The light emitter and detector pairs are mounted along the length of one side of the sash and the detector is connected in parallel with a resistor. The string of light emitters and corresponding detectors is energized and the signal level at the end of the series connection of emitters is monitored. When the sash is present at a given light emitter, the light from the emitter is reflected off the side of the sash and the reflected light is detected by its corresponding light detector. When the detector senses the light reflected off the sash surface, the resistor in parallel with it is bypassed causing a corresponding change in the signal level across the series connection of the detectors. The signal level changes as the sash moves and provides an indication of the position of the sash.

One problem with this method is that the reflected light may not be reliably sensed if the sash surface is not sufficiently reflective. Even if special reflective surfaces are provided, the surfaces may be subject to deterioration from exposure to fumes, which may reduce the reflectivity of the surface. In addition, installation of the system may be difficult where sash panel frames may vary substantially with regards to the distance between frame surfaces and sash surfaces. In fume hoods having several layers of sashes opening and closing, the light reflection may be suitable for the near sashes, but diminish for sashes that are further away. This may result in a failure to detect a closed sash.

Another way of sensing the position of the fume hood sashes involves mounting a string potentiometer to the fume hood. An end of the string potentiometer is fixed to the sash so that the sash pulls the string and changes the resistance on the potentiometer. A voltage measurement determines the extent to which the sash has pulled the string and when properly calibrated, provides the position of the sash.

The apparatuses and methods currently used for determining the position of the sash on a fume hood suffer from requiring mounting structure for sensing mechanisms that is difficult to install. The currently used apparatuses and methods typically require custom installation and designing the solution into the fume hood. The apparatuses and methods are also difficult to calibrate. The difficulty in installing and calibrating the sensing mechanisms affect the reliability, cost and robustness of the position sensing apparatuses.

In view of the foregoing, there is an ongoing need for systems, apparatuses and methods for determining the position of sashes on fume hoods that involve structure that is easy to install and calibrate.

SUMMARY

In view of the above, a system is provided for determining the position of a sash panel in a fume hood formed by at least one movable sash panel. Fume hoods have sash panels mounted over a hood opening to an enclosure structure of the fume hood. The sash panels are moved to open or close the fume hood at the sash opening. Opening the sash panel provides access to a work surface in the fume hood enclosure space.

A system for determining a sash panel position includes a light emitting module comprising a linear array of light emitting elements spaced at equal distances from one another. The light emitting module is mounted on a fume hood frame with the light emitting elements directed to generate a light path normal to a sash panel direction of motion such that the sash panel blocks the light path when positioned at a corresponding one of the light emitting elements. A light sensing module comprises a linear array of light sensing elements spaced at equal distances from one another. The light sensing module is mounted on the fume hood frame on a side of the sash panel opposite the light emitter module. The light sensing elements are aligned to receive the light path generated by corresponding light emitting elements on the light emitting module when the sash panel is not present between the light emitting element and the light sensing element. The light sensing module includes a shift register comprising a plurality of bits corresponding to each of the light sensing elements in the linear array. The shift register stores a state of the light sensing element and serially outputs an output signal comprising a series of bits indicating the state of each light sensing elements, where the series of bits forms a pattern indicating open spaces and closed spaces along the sash panel direction of motion.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As used herein, the term "sash" refers to a movable panel or door positioned to cover a fume hood opening where movement of the sash varies the area of the fume hood opening.

As used herein, the term "sash opening" refers to the fume hood opening defined by the position of the sash panel where the maximum area of the fume hood opening is defined by the area of the fume hood opening with the sash panels positioned at a maximum open position.

I. Fume Hoods and Fume Hood Sashes

Figure 1:
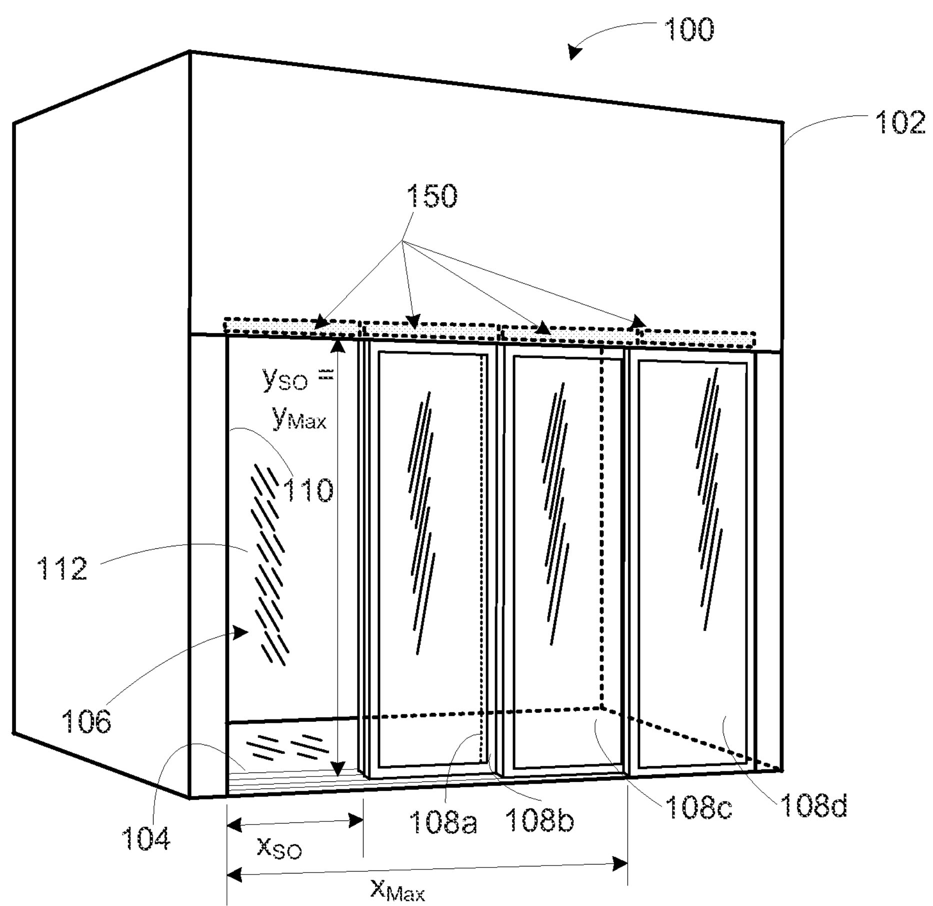
FIG. 1 is a perspective front view of an example of a fume hood in which examples of systems and methods for determining a sash position may be implemented.

FIG. 1 is a perspective view of an example of a fume hood in which example implementations of systems and methods for determining a sash position may be implemented. FIG. 1 shows a fume hood 100 comprising an enclosure structure 102, a work surface 104, and horizontally movable sash panels 108*a-d*. The enclosure structure 102 encloses the area of the work surface 104 on which work involving toxic or noxious fumes, vapors, and/or dust may be performed. A hood opening 106 provides access to the work surface 104. The hood opening 106 may be defined by a cutout in a front side or other side of the enclosure structure 102 having a vertical or longitudinal dimension of "$y_{Max}$" and a horizontal or latitudinal dimension of "$x_{Max}$" as shown in FIG. 1A. The horizontally-movable sash panel 108 is used to open or close the hood opening 106. In the example implementation shown in FIG. 1, the sash panel 108 moves in a horizontal direction such that the sash panel 108 is spaced from an edge 110 to form a sash opening 112 (as portion of hood opening 106) having a sash height $H=y_{sash}$, which has a value within the range of 0 to $y_{Max}$ for providing access to the work surface 104.

The fume hood 100 is connected to an exhaust fan and damper arrangement by ductwork (not shown in the Figures). The exhaust fan serves to draw air from the room through the sash opening 112, the interior of the enclosure structure 102, the ductwork and the damper. The air is then vented outside of the building by the exhaust fan thereby removing fumes, vapors or dust. A fume hood controller (not shown in FIG. 1, but described below with reference to FIG. 5) may be included in or near the fume hood 100 to maintain the speed of the air (referred to herein as the face velocity) drawn through the fume hood 100 within a desired air speed range. If the face velocity is too low, there may be insufficient venting of the work surface 104. If the face velocity is too high, undesirable air turbulence is generated, which may cause movement of the contaminants into a worker's breathing zone, or into the vicinity of the work surface 104 creating a risk of corrupting the work (such as for example, an experiment, or test) being performed.

The fume hood controller may be configured to control the exhaust fan or fans, and dampers to keep the face velocity in the proper range. Typically, the ventilation system for the fume hood may be integrated with the ventilation system of the building in which the fume hood is installed. In such implementations, the fume hood controller may control air valves or dampers to adjust the face velocity. The face velocity is affected by the area or size of the sash opening 112 and any pressure drop that may exist across the sash panel 108. In order to maintain the face velocity within the desired range given that the sash panel 108 is movable, an air valve may be adjusted to take into account the current size of the sash opening 112. For example, an air valve may be controlled to increase air flow as the size of the sash opening 112 is increased. Conversely, the air valve is controlled to decrease the air flow as the size of the sash opening 112 is decreased. Similarly, the air valve may be adjusted to take into account the size of the sash opening 112 for the configuration shown in FIG. 1.

The sash opening area may be determined for the sash openings in the fume hood shown in FIG. 1 from the position of the sash panels 108 and knowing the dimensions of the maximum opening, $x_{Max}$ and $y_{Max}$. The fume hood 100 in FIG. 1 includes a sash position determining system 150 using an array of light emitters on one side of the sash panels 108 and an array of light sensors on the other side of the sash panels 108 disposed along the dimension of sash panel movement (horizontal in the implementation of FIG. 1). The array of light emitters are in a constant 'on' state, or light-emitting state with each light emitter in the array aligned to direct emitted light directly to a corresponding light sensor on the light sensor array. When the sash panels 108 are moved, the positions of the sash panels 108 are marked by the state of the light sensors. If a light sensor detects the emitted light from the corresponding light emitter, no sash panel 108 is present at position corresponding to the light sensor. The presence of one of the sash panels 108 at the position of any one of the light sensors is indicated when the light sensor does not detect any light emitted from the corresponding light emitter. A change in state of the light sensor, from a state of sensing light, to a state of no sensing light, indicates that an edge of the sash panel 108 has moved to the position corresponding to the light sensor.

The sash position-determining system 150 in FIG. 1 is described in further detail with reference to FIGS. 2-7.

II. Sash Position-Determining Module

Figure 2:
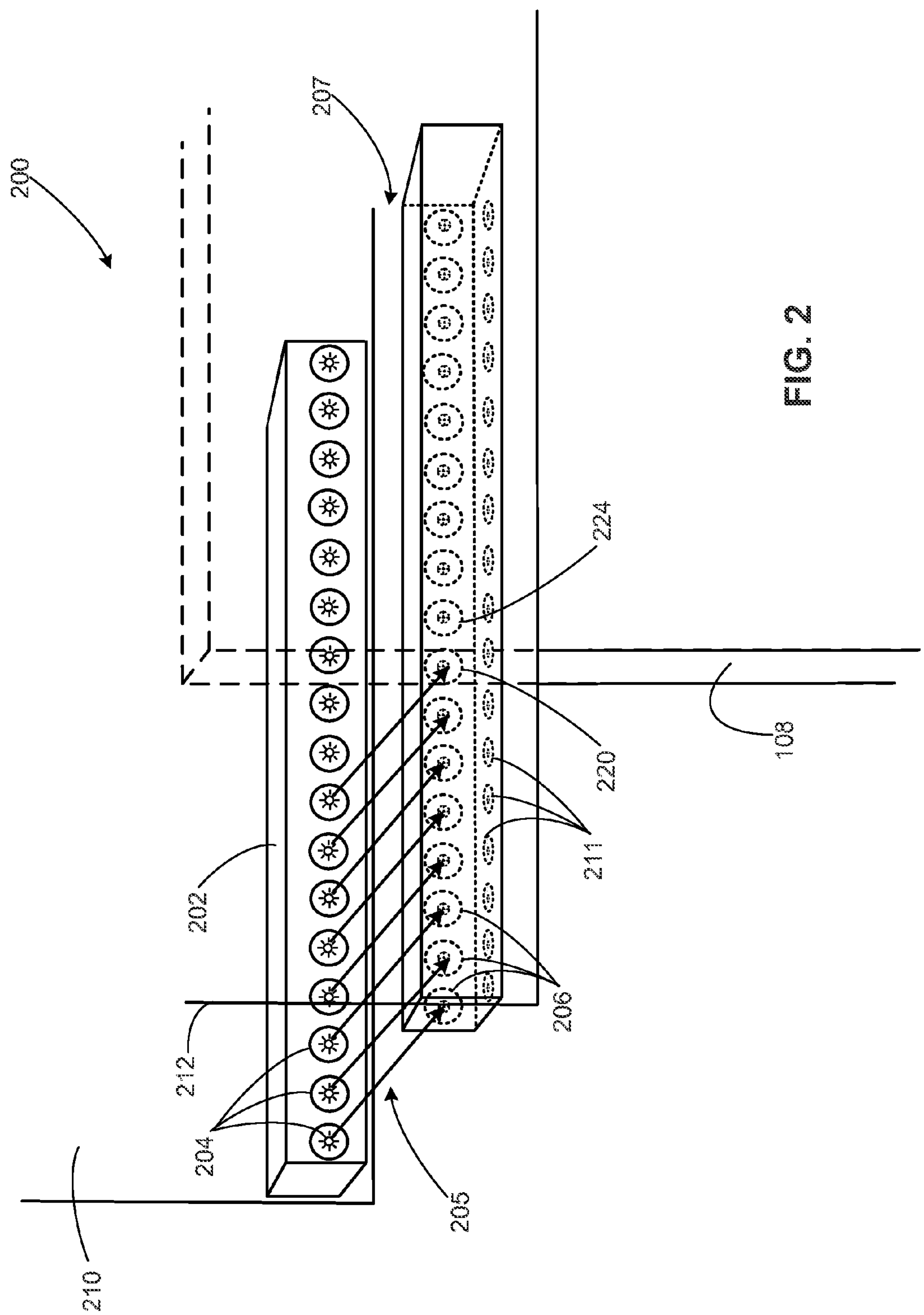
FIG. 2 is a transparent perspective view of an example implementation of a sash position determining system in a fume hood with a horizontally movable sash panel.

FIG. 2 is a transparent rear perspective view of an example of a portion of a fume hood 200 where a light emitter module 202 is mounted on a first sash frame side 210 and a light sensor module 206 is mounted on a second the sash frame side 212 opposite the sash panel 108. The light emitter module 202 and the light sensor module 206 attach to the sash frame sides 210, 212 at a top side of the sash panel 108. The mounting of the modules on the top side is illustrated in FIG. 2 as an example. The light emitter module 202 and the light sensor module 206 may be mounted on any side and oriented along a direction of movement of the sash panel 108.

The light emitter module 202 may be mounted on the sash frame side 210 that is inside the fume hood enclosure. The light sensor module 206 may be mounted on the sash frame side 212 that is outside the frame hood enclosure. Either side may be selected for either module. In some implementations, the mounting of the light sensor module 206 on the outside of the fume hood enclosure may reduce the possibility that fumes from inside the fume hood enclosure would block a light path between an emitter and a sensor causing a false indication that the door is present.

The light emitter module 202 in FIG. 2 comprises a linear array of light emitting elements 204 extending along a direction in which the sash panel 108 moves. The light emitting elements 204 are arranged to emit light along a direction normal to the direction of motion of the sash panel 108. The light sensor module 206 comprises a linear array of light sensing elements 208 extending along a direction parallel to the linear array of light emitting elements 204. The light sensing elements 208 are arranged to sense light emitted from a corresponding one of the light emitting elements 204 on the light emitter module 202. The light emitting elements 204 and the light sensing elements 208 are positioned a fixed distance from each other to provide a linear relation between the signals detected from each element 208. In one example, the light emitting elements 204 and light sensing elements 208 may be positioned ½" apart, however, any suitable dimension may be used depending on the desired positional precision.

The light sensor module 206 also includes a linear array of status indicator elements 211 corresponding to the light sensing elements 208. The status indicator elements 211 are LEDs, or other suitable light emitting elements, that may be electrically connected so as to provide the detection status of the light sensing elements 208. For example, each status indicator element 211 may be connected to emit light if the light sensing element 208 that corresponds to the status indicator element 211 based on the position of the light sensing element 208 in the linear array is sensing light from its corresponding light emitting element 204. The status indicator element 211 would be turned off if its corresponding light sensing element 208 is not sensing light. The status indicator elements 211 are shown mounted on a bottom surface of the light sensor module 206, however, the status indictor elements 211 may be located anywhere that makes them visible to a user of the fume hood. The status indicator elements 211 advantageously provide the user with a visible indicator of the status of the light sensing elements 208 to permit detection of any malfunction or fault condition with respect to any one of the light sensing elements 208. For example, the status indicator elements 211 allow a user to detect a condition in which the sash panel 108 is positioned so that a certain set of the light sensing elements 208 should be sensing light, and one or more of the status indicator element 211 corresponding to the set of light sensing elements 208 is not emitting light. Such a condition may indicate failure of the set of light sensing elements 208. The condition may also indicate the presence of something blocking the light path to the light sensing elements 208, such as dirt or some other obstructing agent.

When the sash panel 108 is not present between a particular light emitting element 204 and the corresponding light sensing element 208, the light from the light emitting element 204 is received directly by the light sensing element 208 as shown generally at 205. When the sash panel 108 is positioned in between a particular light emitting element 204 and the corresponding light sensing element 208, the sash panel 108 blocks the light from reaching the light sensing element 208 as shown generally at 207. It is noted that the sash panel 108 is assumed to be opaque. Sash panels 108 having a metal frame, or a frame of another light blocking material, in the area that blocks the light between light emitting elements 202 and light sensing elements 208 when the sash panel 108 is present may be sufficient to enable the sash panel detection. Sash panels 108 that are made of glass or another clear material may be provided with an opaque strip adhesively attached in the area that blocks the light.

The light emitter module 202 and the light sensor module 206 permits detection of an edge of the sash panel 108 by identifying a light emitting element 204 and corresponding light sensing element 208 at which light is not blocked (at 220) adjacent to a light emitting element 204 and corresponding light sensing element 208 at which the light is blocked by the sash panel 108 (at 224). A fume hood controller may monitor the changes in the state of the light sensing elements 208 to detect the travel of the edge of the sash panel 108 as the sash panel 108 moves between closing and opening.

In an example implementation, the light emitter elements 204 may be infrared light emitting diodes (LEDs) and the light sensing elements 208 are photodetectors capable of detecting infrared light. The selection of infrared emitters and sensors over emitters and sensors of light in the visible range may reduce the possibility of a false detection by the sensing elements when stray light is incident on the sensing elements. In addition, by directing the infrared light emitting elements into the infrared sensing elements, a certain level of infrared light may be expected at the light sensing elements 208. The expected level of light may be adjusted to be higher than the intensity of stray infrared light that may be incidentally directed to the light sensing elements 208 from other sources. A threshold level may be determined from the expected level of light, which may be used to distinguish a light level received at an individual light sensor as being light emitted by one of the light emitting elements 204 from stray light. The definition and use of a threshold may be performed as a hardware function, a software function, or a combination of hardware and software.

It is noted that the implementation illustrated in FIG. 2 is schematic in nature in that only the light emitting and light sensing elements are depicted. Each module may include control circuitry that interfaces with the light emitting and light sensing elements to monitor a pattern of elements that have blocked light paths against the unblocked light paths. Examples of such control circuitry is described below with reference to FIGS. 3-6.

III. Daisy-Chained Modules

Figure 3:
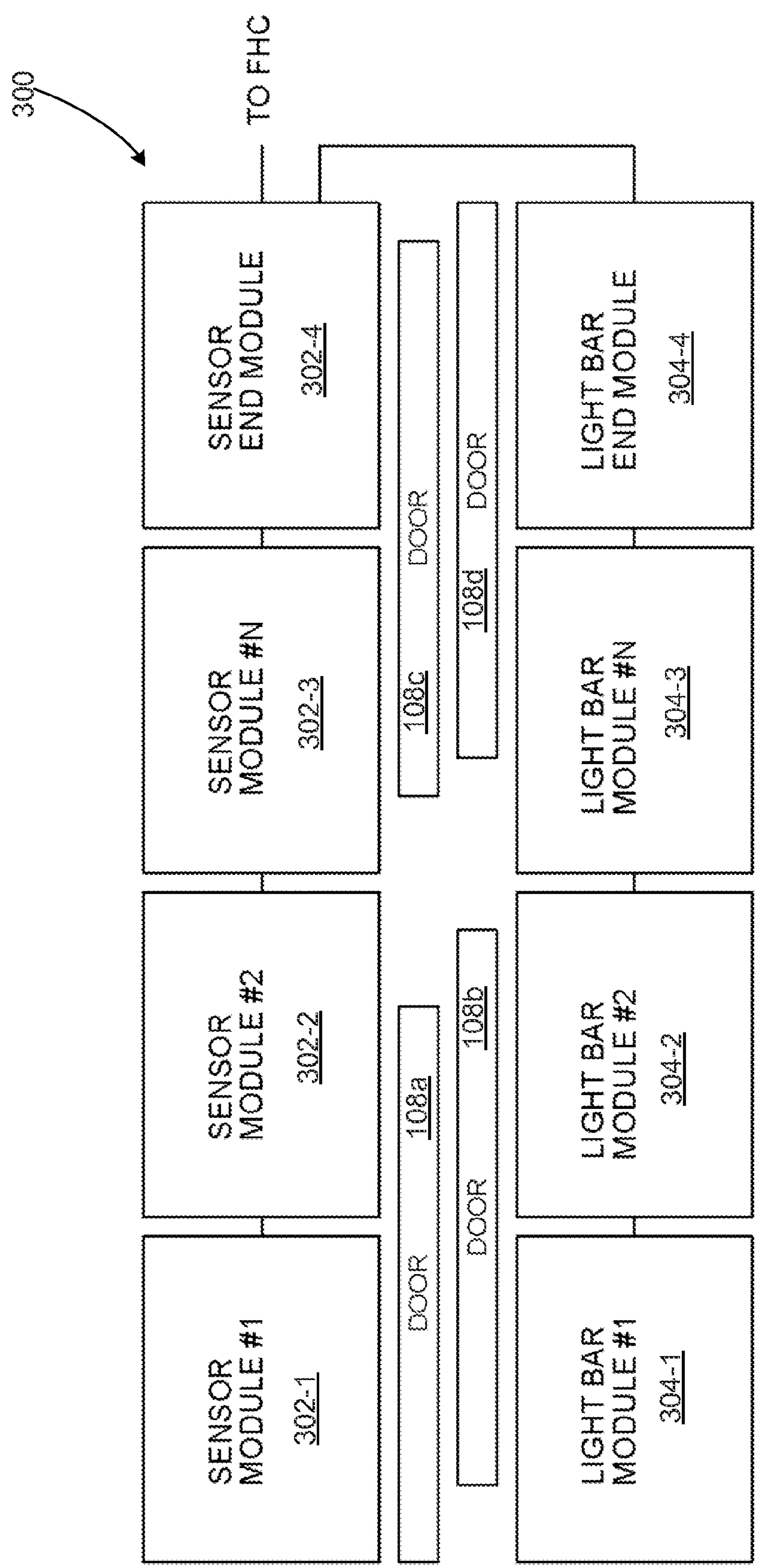
FIG. 3 is a block diagram of an example implementation of a multiple module sash position determining system.

FIG. 3 is a block diagram of an example implementation of a multiple module sash position determining system 300. The multiple module sash position determining system 300 includes a plurality of light sensor modules 302 and a plurality of light emitter modules 304 positioned on opposite sides of a plurality of sash panels 108. The multiple module sash position determining system 300 in FIG. 3 includes four light sensor modules 302-1, 302-2, 302-3, 302-4, and four light emitter modules 304-1, 304-2, 304-3, 304-4. Each light sensor module 302 and light emitter module 304 includes a linear array of sensors and emitters as illustrated in FIG. 2. In an example implementation, the light sensor modules 302 and the light emitter modules 304 all include the same number of elements providing a format that may be standardized. Each standard light sensor module 302 and the light emitter module 304 may correspond to a specific length, which would be measured against the distance of travel by the sash panel. Multiple light sensor modules 302 and the light emitter modules 304 are mounted along the distance of travel by the sash panels 108 as shown in FIG. 3.

The number of light sensor modules 302 and light emitter modules 304 that may be used in a specific installation may depend on the maximum length of the opening of the fume hood along the given dimension. For example, the number of light sensor modules 302 and the light emitter modules 304 that may be mounted in the fume hood 100 in FIG. 1 depends on the dimension $x_{Max}$ and the distance covered by each module.

The fourth light sensor module 302-4 and the fourth light emitter modules 304-4 are identified in FIG. 3 as being a sensor end module 302-4 and an emitter end module 304-4. The sensor end module 302-4 and the emitter end module 304-4 may be different from the other light sensor modules 302-1, 302-2, 302-3 and light emitter modules 304-1, 304-2, 302-3 in that the sensor end module 302-4 and emitter end module 304-4 includes control circuitry and a communication interface. The control circuitry may be used to control the state of the emitter elements, and to monitor the state of the sensing elements for all of the light sensing modules 302 and light emitter modules 304. The control interface may be used to communicate data relating to the position of the sash panels 108 to a fume hood controller ("FHC"), for example.

In one example implementation, the light sensor modules 302-1, 302-2, 302-3 may be implemented to be physically different from the sensor end module 302-4. In another example implementation, the four light sensing modules 302-1, 302-2, 302-3, 302-4 may be designed to be identical modules and configured to permit enabling an individual module for operation as either an end module or a module to be connected down the line, either at installation, or when a system is specified for a specific implementation. Where the four light sensing modules 302-1, 302-2, 302-3, 302-4 are identical modules, the control and communication circuitry provided in the sensor end module 302-4 described above would not be used in the light sensing module 302 that happens to be connected to the end of the daisy-chain that communicates to the fume hood controller. The differentiation of the sensor end module 302-4 may be implemented, for example, by adding functions that bypass the control and communication circuitry on non-end modules, by adding hardware such as dipswitches or similar components that allow for use or non-use of selected components, by depopulating sockets that carry the specific control and communication components when the module is not to be used as an end module, or a combination of these techniques. It is noted that the above list of techniques for differentiating modules is not limiting as any suitable technique that may or may not be listed may be used. In addition, the light emitter modules 304-1, 304-2, 304-3, 304-4 are not described as having control and communication circuitry, however, the control and communication circuitry may be implemented on either light sensing modules, or on light emitting modules, or both. Other circuitry may also be included that distinguishes the end modules from the other modules for either the light sensor modules 302 or the light emitter modules 304. The light emitter modules 304-1, 304-2, 304-3, 304-4 may be implemented as identical modules and differentiated for use as described for the light sensor modules 302-1, 302-2, 302-3, 302-4.

The multiple module sash position determining system 300 in FIG. 3 advantageously detects the position of the sash panels 108. In a given implementation, the position determination of the sash panels 108 is not specific with regards to any individual sash panel 108. For example, light sensor modules 302-1 and 302-2 and light emitter modules 304-1 and 304-2 may monitor the sash panel positions of sash panels 108*a* and 108*b*. However, the light sensor modules 302-1 and 302-2 and light emitter modules 304-1 and 304-2 detects lengths where the fume hood is open based on lengths along the fume hood opening at which no sash panel 108 is present. That is, the states of the light sensing elements on the light sensor modules 302-1 and 302-2 and light emitter modules 304-1 and 304-2 monitoring the sash panels 108*a* and 108*b* identify lengths along which the fume hood is open. If the lengths are along the x-direction as shown in FIG. 1, the area of opening may be determined from the lengths of opening and the known sash opening in the y-direction, $y_{Max}$. In addition, sash panels 108*a*, 108*b*, 108*c*, and 108*d* may form multiple openings. The multiple openings are easily detected by the multiple light sensing modules 302 making it easy to determine the entire opening area.

Figure 4:
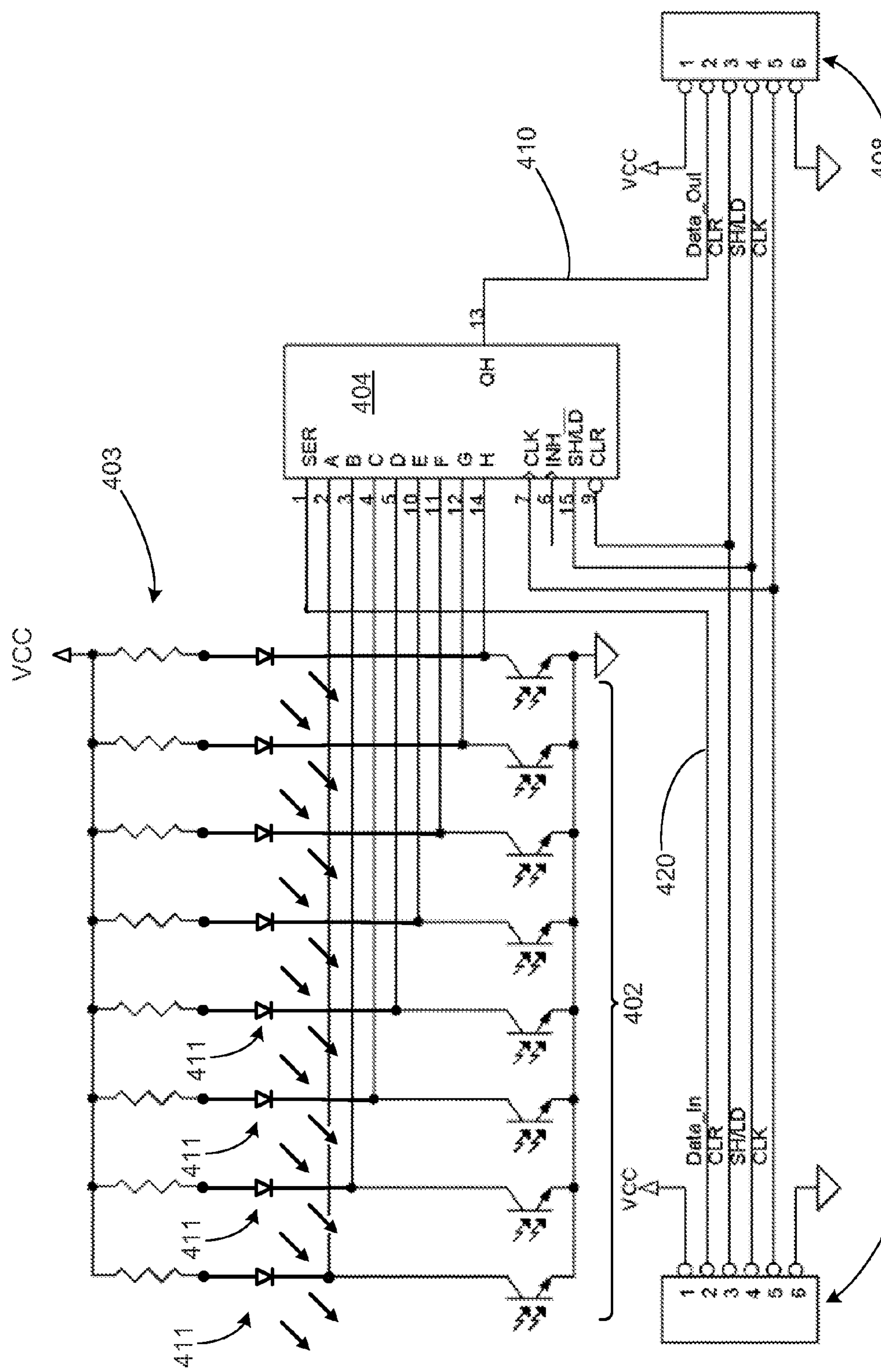
FIG. 4 is a schematic electrical diagram of a light sensing module of a type that may be used in the implementation shown in FIG. 3

FIG. 4 is a schematic electrical diagram of a light sensing module 400 of a type that may be used in the implementation shown in FIG. 3. The light sensing module 400 in FIG. 4 includes a linear array of sensing elements 402, which is implemented as an array of photodetectors 402 presumed for purposes of illustration to be infrared photodetectors. The photodetectors 402 are biased to provide a signal of approximately $V_{CC}$ (depending on the voltage drop at the pull-up resistors 403 on each photodetector 402) when the photodetector 402 is blocked by the sash panel 108 (in FIG. 2). When the photodetector 402 is unblocked, light is received at each unblocked photodetector 402. The received light turns the photodetector 'on' to conduct current from the supply, $V_{CC}$, bringing the voltage output of the photodetector down to close to 0 v. The light sensing module 400 also includes a set of status indicator elements 411 connected in series with the photodetectors 402. The status indicator elements 411 are connected so as to emit light when the corresponding photodetector 402 detects light. It is noted that the status indicator elements 411 are optional. In some implementations, the status indicator elements 411 are not used.

The voltage output by each photodetector 402 is transferred to an input to a shift register 404. Each photodetector 402 connects to a designated input of the shift register 404 providing a place in the shift register 404 that corresponds to the place of the photodetector 402 in the array of photodetectors 402 relative to the other photodetectors 404. A clock signal input (CLK) to the shift register 404 to synchronize operation of the shift register 404 with other components on the light sensing module 400 as well as on other light sensing modules in the chain. The shift register 404 may be maintained in a "LOAD" state in which the state of each photodetector 402 is latched in at the corresponding position, or bit, in the shift register 404 with each clock (CLK) signal. A controller may request to read the state of each photodetector 402 by changing the state of the shift register 404 to a "SHIFT" state. In the "SHIFT" state, the state of each bit may be serially output at a serial output (QH) with each clock signal (CLK). The shift register 404 may include a "SER" bit input, which may be used to receive the bit states of each photodetector on light sensing modules further up in the daisy-chain. During a read in a "SHIFT" state, the state of the bits corresponding to the photodetectors 402 may be serially output, followed by the state of the photodetectors on modules further up in the chain.

The light sensing module 400 in FIG. 4 includes an input connector 406 and an output connector 408 to facilitate the daisy-chaining of the light sensing module 404 with other light sensing modules 404. The input connector 406 may be connected to an output connector 408 on a next light sensing module 400 in a daisy-chain of modules. The input connector 406 includes connections designated for communicating a CLK signal and a DATA_in signal. In the example illustrated in FIG. 3, the DATA_in signal is communicated as a stream of bits on a single line. The stream of bits received at the DATA_in connection carries the bit state of each of the photodetectors on light sensing modules further up in the daisy-chain of modules. For example, if the light sensing module 400 is implemented in FIG. 3 as the second light sensing module 302-2, the DATA_in signal on the input connector 406 may receive a serial stream of bits representing the state of the photodetectors on the first light sensing module 302-1 (see FIG. 3). The serial stream of bits may be received during a "SHIFT" operation and communicated to the "SER" bit of the shift register 404.

The output connector 408 receives the stream of bits indicating the state of the photodetectors 402 from a connection 410 output from the serial output (QH) of the shift register 404. The serial output (QH) may also communicate a stream of bits indicating the states of photodetectors on light sensing modules further up the daisy-chain. The stream of bits communicated to the output connector 408 is communicated to a DATA_out connection of the output connector 408, which may be connected to a next module in the daisy-chain.

Figure 5:
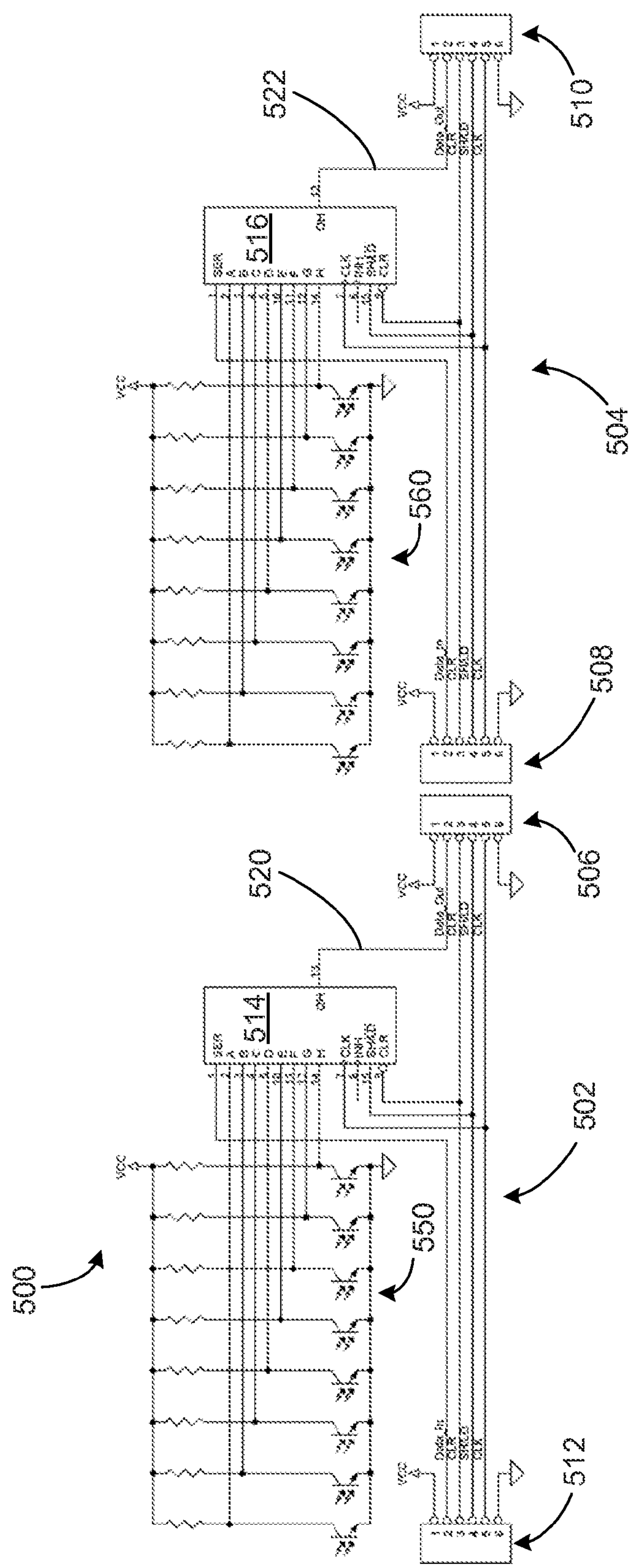
FIG. 5 is a schematic diagram of two light sensing modules implemented as a multiple module sash positioning system.

The daisy-chaining of light sensing modules 400 is illustrated in FIG. 5. FIG. 5 is a schematic diagram of two light sensing modules 502, 504 implemented as a multiple module sash positioning system 500. The two light sensing modules 502, 504 are similar to the light sensing module 400 in FIG. 4, except without the inclusion of the status indicator elements 411. The first light sensing module 502 in FIG. 5 includes photodetectors 550 connected to a shift register 514. The shift register 514 may receive a stream of bits representing the state of the photodetectors on light sensing modules to the left of the first light sensing module 502. The shift register 514 may receive the stream of bits via an input connector 512.

The shift register 514 may output the state of the photodetectors 550 and, for any light sensing module to the left, the state of the photodetectors on the modules to the left to an output connector 506, which is connected to an input connector 508 on the second light sensing module 504. The input connector 508 of the second light sensing module 504 may communicate the stream of bits received from the first light sensing module 502 to a shift register 516 on the second light sensing module 504. The shift register 516 may output the stream of bits received from the first light sensing module 502 and the stream of bits indicating the state of an array of photodetectors 560 on the second light sensing module 504 to an output connector 510. The output connector 510 connects the stream of bits representing the states of the photodetectors on the first and second light sensing modules 502, 504 and of any other modules that may be connected to the left of the first light sensing module 502 to a next module.

It is noted that the communication of streams of bits may be controlled to occur when certain signals are triggered to a given state. For example, each light sensing module 502, 504 may include inputs, outputs and signal lines for communicating a "SHIFT" signal. A controller may trigger the "SHIFT" to an active state to initiate the communication of the stream of bits from the outermost light sensing module to the last output connector in the chain, which communicates the stream of bits to the controller. The "SHIFT" signal may be held until the communication of the stream of bits is complete. The "SHIFT" signal may then be triggered to an inactive state. In an example, the inactive state of the "SHIFT" signal may be equivalent to the active state of the "LOAD" signal, which permits latching of the state of the photodetectors in the shift registers.

Figure 6:
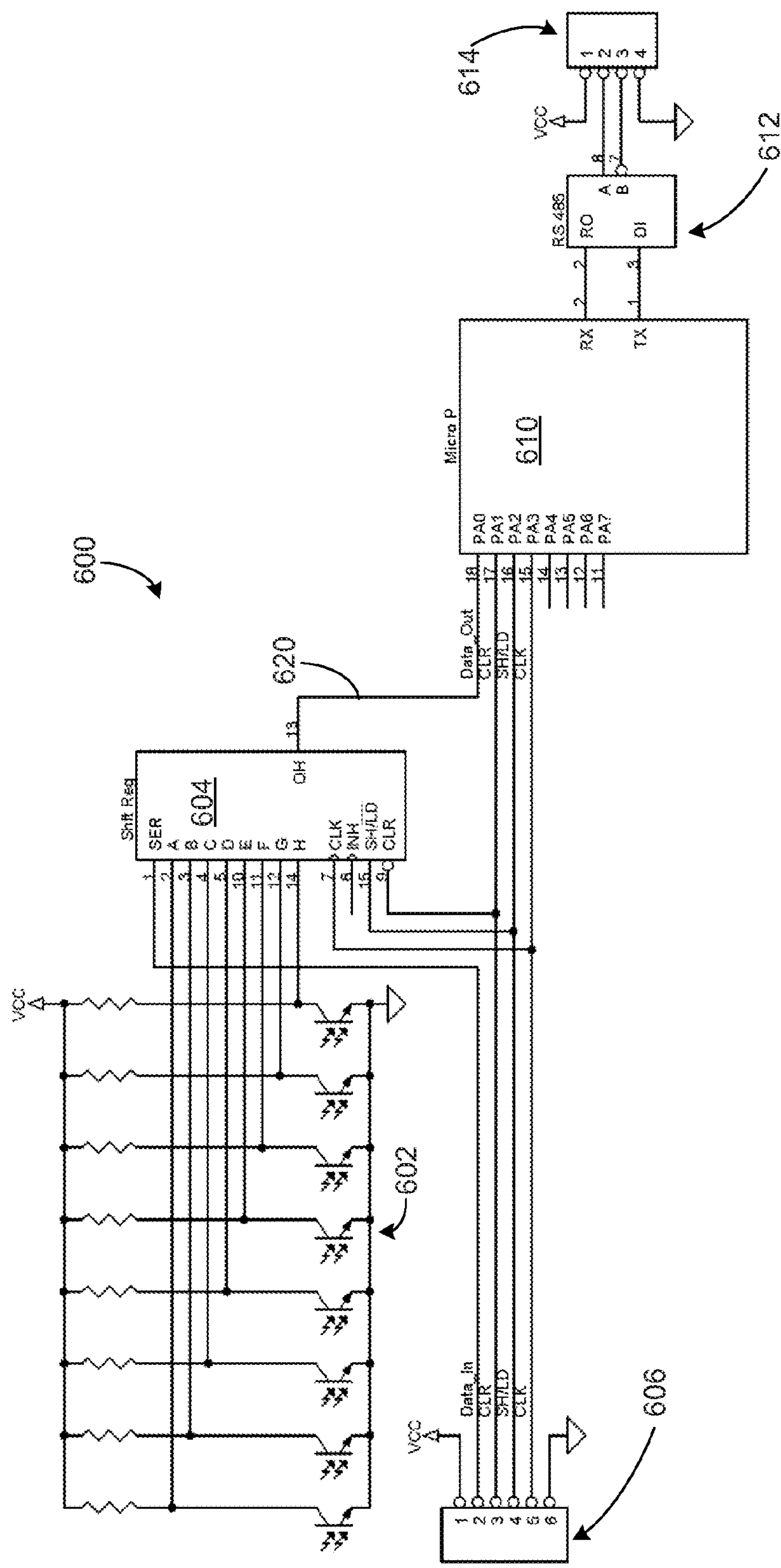
FIG. 6 is a schematic diagram of an end sensing module configured to communicate via an RS 485 bus.

A daisy-chain of light sensing modules may be terminated with an end sensing module. FIG. 6 is a schematic diagram of an end sensing module 600 configured to communicate via an RS 485 bus. The end sensing module 600 is similar to the light sensing module 400 except for the inclusion of certain control circuitry. The end sensing module 600 in FIG. 6 includes an array of photodetectors 602 connected to corresponding bits of a shift register 604. An input connector 606 may receive a stream of bits from light sensing modules connected to the right of the end sensing module 600 if any such modules are connected. The input connector 606 communicates the stream of bits to the shift register 604 at a "SER" input. The shift register 604 may then serially output the stream of bits for the array of photodetectors 602 on the end sensing module 602 as well as that of any other light sensing module connected to the left of the end sensing module 600. The serially output stream of bits may be output to a controller 610. The controller 610 may control the state of the control lines, such as "SHIFT," "LOAD," and "CLK," used to control the light sensing modules. The controller 610 may include a multi-bit shift register, or serial buffer, to store the bits indicating the state of the photodetectors on the light sensing modules connected to the end sensing module 600, if any. The serial buffer after a reading of the photodetectors may contain a pattern of bits that indicates the extent to which the fume hood is open. For example, if a 0 indicates an "open" state in which the sash panel is not present at the photodetector corresponding to a given bit, and a 1 indicates a "closed" state in which the sash panel blocks light to the photodetector, the spaces in which the fume hood opening is open may be given by a string of '0's' and the spaces in which the fume hood opening is closed may be given by a string of '1's.'

The controller 610 may perform calculations and analysis of the pattern of bits received. Such calculations may be for determining, for example, the dimensions of any openings. The pattern of bits may also be analyzed for invalid bit patterns indicative of a malfunction or some other condition or state considered faulty, thereby enhancing the reliability and safety of the fume hood. The controller 610 may output the bit pattern or the results of any calculations to a fume hood controller. It is noted that the calculations and analysis of the pattern of bits received may be performed by the controller 610 or a fume hood controller configured to monitor the overall function and state of the fume hood.

The end sensing module 600 in FIG. 6 includes an RS485 bus interface 612 connected to an interface 614. A fume hood controller bus interface may connect to the interface 614 to communicate using the RS485 communication standard. It is noted that the RS485 standard is illustrated by way of example. Any suitable communication interface, whether standard or proprietary, may be used as well.

IV. System for Controlling Ventilation in a Fume Hood

Figure 7:
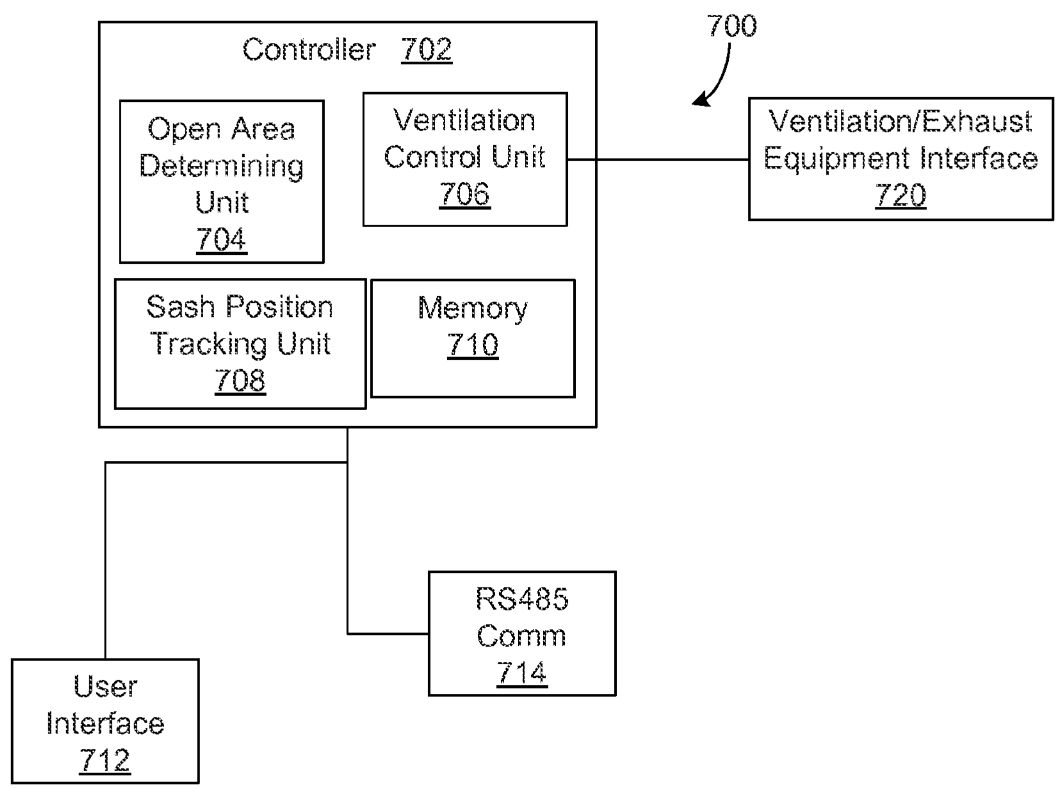
FIG. 7 is a block diagram of a system for controlling ventilation in a fume hood.

FIG. 7 is a block diagram of a system 700 for controlling ventilation in a fume hood. The system 700 in FIG. 7 includes a controller 702 configured to perform functions that include (without limitation):

- an open area determining unit 704 using, for example, data received from the end sensing module 600 in FIG. 6,
- a ventilation control unit 706, and
- a sash position tracking unit 708 using, for example, data received from the end sensing module 600 in FIG. 6.

The controller 702 may also include memory 710 and connections to user interface devices 712. The controller 502 may also have a connection to an RS485 communications interface 714 to receive a stream of bits indicating the state of the photodetectors on the light sensing modules.

The controller 702 may perform the function of tracking the sash position using the sash position tracking unit 708 by bit patterns indicating the state of the photodetectors, which indicate the open v. closed spaces of the fume hood opening. The information may be used to determine the total open area of the fume hood opening providing the extent to which the fume hood opening is closed by the sash panels. The ventilation control unit 706 uses the area of the sash opening to control the ventilation in the fume hood so that the face velocity is maintained within a desired range. The ventilation control unit 706 may communicate with ventilation/exhaust equipment through a ventilation/exhaust equipment interface 730 to adjust fans and dampers as determined by the ventilation control unit 706. The ventilation/exhaust equipment interface 730 may also include connections to strategically placed pressure sensors to measure a pressure gradient between the inside of the fume hood and the outside of the fume hood. The actual algorithms for determining the proper settings of the fans and/or dampers for a desired range of face velocity are well known to those of ordinary skill in the art and, therefore, need not be discussed in any further detail.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A system for determining a sash panel position at a sash opening in a fume hood formed by at least one movable sash panel mounted over a hood opening to an enclosure structure of the fume hood, the system comprising:

- a light emitting module comprising a linear array of light emitting elements spaced at equal distances from one another, the light emitting module mounted on a fume hood frame with each of the light emitting elements directed to generate a light path normal to a sash panel direction of motion such that the sash panel blocks the light path when positioned at a corresponding one of the light emitting elements;
- a light sensing module comprising a linear array of light sensing elements spaced at equal distances from one another, the light sensing module mounted on the fume hood frame on a side opposite the sash panel, the light sensing elements being aligned to each receive the light path generated by a corresponding light emitting element on the light emitting module when the sash panel is not present between the light emitting element and the light sensing element; and
- a shift register in the light sensing module comprising a plurality of bits corresponding to each of the light sensing elements in the linear array, the shift register configured to store a state each light sensing element and to output an output signal comprising a series of bits indicating the state of each light sensing element;
- where the series of bits forms a pattern indicating open spaces and closed spaces along the sash panel direction of motion.

2. The system of claim 1 where the light sensing module further comprises:

- an output connector configured to receive the series of bits from the shift register, and to output the series of bits to a data output connection.

3. The system of claim 1 where the shift register further comprises a serial stream input configured to receive a stream of bits indicative of the state of light sensing elements on a second light sensing module, the light sensing module further comprising:

- an input connector configured to receive an external series of bits from the second light sensing module and to provide a signal connection to the serial stream input of the shift register for the external series of bits;
- where the shift register is configured to serially output the output signal comprising the series of bits followed by the external series of bits from the serial stream input of the shift register when the second light sensing module is connected to provide the external series of bits.

4. The system of claim 3 where the light sensing module further comprises:

- a controller configured to receive the output signal comprising the series of bits followed by the external series of bits when the second light sensing module is connected to provide the external series of bits, the controller configured to store the output signal in a buffer of single bit elements.

5. The system of claim 4 where the light sensing module comprises a communication interface for communicating the buffer of single bit elements to a fume hood controller.

6. The system of claim 5 where the communication interface is an interface base on the RS485 standard.

7. The system of claim 4 where the light sensing module is an end sensing module, the system further comprising:

a plurality of light sensing modules, each comprising:

a linear array of light sensing elements spaced at equal distances from one another, the plurality of light sensing modules mounted end to end on the fume hood frame extending from the end sensing module, the light sensing elements being aligned to receive the light path generated by corresponding light emitting elements;

a shift register comprising a plurality of bits corresponding to each of the light sensing elements in the linear array, the shift register configured to store a state of the light sensing element and to serially output an output signal comprising a continuous series of bits indicating the state of each light sensing elements, the shift register further comprising a serial stream input configured to receive a stream of bits indicative of the state of light sensing elements on another one of the plurality of light sensing modules;

an input connector configured to receive an external series of bits from the other ones of the plurality of light sensing modules and to communicate the external series of bits to the serial stream input of the shift register; and an output connector connected to receive the series of bits from the shift register, and to provide a signal output for the series of bits on a data output connection.

8. The system of claim 7 further comprising:

a plurality of light emitting modules corresponding to the plurality of light sensing modules plus the end sensing module.

9. The system of claim 1 where:

the light emitting elements are infrared light emitting diodes (LEDs); and the light sensing elements are photodetectors for detecting infrared light.

10. The system of claim 1 further comprising:

an opaque strip adhesively attachable to a surface of the sash panel in the area of the sash panel that travels between the light emitting elements and the light sensing elements.

11. The system of claim 1 where the light sensor module further comprises:

a linear array of status indicator elements corresponding to the linear array of light sensing elements, each status indicator element configured to indicate a light sensing status of its corresponding light sensing element, thereby providing a visible indicator of the light sensing status of each light sensing element to a user.

12. A method for determining an area of a sash opening in a fume hood formed by at least one movable sash panel mounted over a hood opening to an enclosure structure of the fume hood, the method comprising:

providing at least one light emitter module mounted on a fume hood frame with a plurality of light emitting elements directed to generate a plurality of light paths directed to corresponding light sensing elements on a light sensing module mounted on the fume hood frame on a side opposite the sash panel;

detecting a state of the light sensing elements;

inputting a stream of bits, each bit indicating an 'OPEN' or 'CLOSED' state, where each bit corresponds to a specific one of the light sensing elements and the state of each bit corresponds to the state of the light sensing element corresponding to the bit;

using the stream of bits to detect a bit pattern indicative of lengths of open spaces and lengths of closed spaces along a direction of travel of the sash panels; and using the bit pattern to calculate lengths of open spaces along the direction of travel, and using the lengths of open spaces to calculate an area of open space.

13. The method of claim 12 where the light sensing module is an end sensing module and the light emitting module is an emitting end module, the method further comprising:

providing a plurality of light emitter modules, each comprising a plurality of light emitter modules, the plurality of light emitter modules connected to the emitting end module to generate light paths;

providing a plurality of light sensing modules connected to the end sensing module, the plurality of light sensing modules configured to receive the light paths from corresponding light emitting elements on the plurality of light emitter modules;

initiating a data shift signal to each of the plurality of light sensing modules and the end sensing module;

during the data shift signal:

shifting a series of bits indicative of the state of the light sensing elements on a first of the plurality of light sensing modules opposite the end sensing module to a next one of the plurality of light sensing modules;

shifting a next series of bits indicative of the state of the light sensing elements on a next one of the plurality of light sensing modules followed by the series of bits from the first one of the plurality of light sensing modules to a next one of the plurality of light sensing modules; and continuing the shifting of a next series of bits until the next one of the plurality of light sensing modules is the end sensing module.

14. The method of claim 13 further comprising:

receiving an output signal comprising the series of bits indicative of the state of light sensing elements on each of the plurality of light sensing modules and the end sensing module at a controller; and storing the output signal in a buffer.

15. The method of claim 14 further comprising:

outputting the buffer to a fume hood controller via a communication interface.

16. A fume hood control system configured to control ventilation based on a sash opening area, the system comprising:

a sash position determining system comprising:

a plurality of light emitting elements mounted on a frame member extending along an edge of a sash panel in a sash panel direction of movement, each light emitting element positioned a fixed distance apart, the plurality of light emitting elements mounted to generate a plurality of light paths towards the sash panel when the sash panel is positioned to block the light path;

a plurality of light sensing elements mounted on another frame member extending along another edge of the sash panel, each light sensing element positioned a distance equal to the fixed distance apart, the plurality of light sensing elements mounted on a side opposite the sash panel, each light sensing element positioned to receive a light path of the plurality of light paths from a corresponding one of the light emitting elements when the sash panel is not positioned in the light path;

at least one shift register comprising a plurality of bits corresponding to each of the light sensing elements in the linear array, the shift register configured to store a state of the light sensing element and to serially output an output signal comprising a continuous series of bits indicating the state of each light sensing elements; and a sash position determining controller configured to receive the output signal from the shift register and to output the output signal via a communication interface; and a fume hood controller configured to receive the output signal from via the communication interface, the fume hood controller configured to determine a sash opening area by:

determining an opening length along a first dimension in the direction of sash panel movement by multiplying the number of bits in the output signal indicative of an opening by the fixed distance between the light sensing elements; and multiplying the opening length by an opening length along a second dimension; and a ventilation control unit configured to adjust the ventilation in the fume hood according to the sash opening area.

17. The system of claim 16 where:

the plurality of light emitting elements are mounted on at least one fixed length light emitting module, each light emitting module comprising predetermined number of the plurality of light emitting elements.

18. The system of claim 16 where:

the plurality of light sensing elements are mounted on at least one fixed length light sensing module, each light sensing module comprising a predetermined number of the plurality of the light sensing elements.

19. The system of claim 18 where each light sensing module further comprises:

at least one of the plurality of shift registers comprising a plurality of bits corresponding to each of the light sensing elements mounted on the fixed length light sensing module, the shift register configured to store a state of the light sensing elements and to serially output an output signal comprising a series of bits indicating the state of each light sensing elements.

20. The system of claim 19 where the light sensing module further comprises:

an output connector connected to receive the series of bits from the shift register, and to provide a signal output for the series of bits on a data output connection.

21. The system of claim 20 where the shift register further comprises a serial stream input configured to receive a stream of bits indicative of the state of light sensing elements on a second light sensing module, the light sensing module further comprising:

an input connector configured to receive an external series of bits from the second light sensing module, and to provide a signal connection to the serial stream input of the shift register for the external series of bits;

where the shift register is configured to serially output the output signal comprising the series of bits followed by the external series of bits from the serial stream input of the shift register when the second light sensing module is connected to provide the external series of bits.

22. The system of claim 16 further comprising:

a linear array of status indicator elements corresponding to the linear array of light sensing elements, each status indicator element configured to indicate a light sensing status of its corresponding light sensing element, thereby providing a visible indicator of the light sensing status of each light sensing element to a user.

* * * * *